United States Patent
Davis et al.

(10) Patent No.: US 8,874,835 B1
(45) Date of Patent: Oct. 28, 2014

(54) DATA PLACEMENT BASED ON DATA PROPERTIES IN A TIERED STORAGE DEVICE SYSTEM

(71) Applicant: Pure Storage, Mountain View, CA (US)

(72) Inventors: John Davis, Mountain View, CA (US); Ethan Miller, Mountain View, CA (US); Brian Gold, Mountain View, CA (US); John Colgrove, Mountain View, CA (US); Peter Vajgel, Mountain View, CA (US); John Hayes, Mountain View, CA (US); Alex Ho, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 14/157,481

(22) Filed: Jan. 16, 2014

(51) Int. Cl.
*G06F 12/00* (2006.01)
*G06F 3/06* (2006.01)

(52) U.S. Cl.
CPC ............ *G06F 3/0679* (2013.01); *G06F 3/0619* (2013.01); *G06F 3/0641* (2013.01)
USPC .......................................... 711/103; 711/156

(58) Field of Classification Search
CPC ....... G06F 12/00; G06F 12/08; G06F 3/0604; G06F 2212/403; G06F 11/1044
USPC .................................................. 711/103, 156
See application file for complete search history.

(56) References Cited

U.S. PATENT DOCUMENTS

| | | | |
|---|---|---|---|
| 2010/0251077 A1* | 9/2010 | Kim et al. | 714/773 |
| 2011/0314354 A1* | 12/2011 | Fillingim | 714/760 |
| 2012/0311388 A1* | 12/2012 | Cronin et al. | 714/42 |
| 2013/0132638 A1 | 5/2013 | Horn et al. | |
| 2013/0173844 A1 | 7/2013 | Chen et al. | |
| 2013/0290624 A1* | 10/2013 | Crawford et al. | 711/112 |
| 2014/0006733 A1* | 1/2014 | Seo et al. | 711/156 |

* cited by examiner

*Primary Examiner* — Aimee Li
*Assistant Examiner* — Christopher Do
(74) *Attorney, Agent, or Firm* — Womble Carlyle Sandridge & Rice LLP

(57) ABSTRACT

A method for managing non-volatile memory is provided. The method includes determining at least one property of a data and determining to which type of a plurality of types of flash memory to write the data, based on the at least one property of the data. The plurality of types of flash memory includes at least two types having differing numbers of bits per cell. The method includes writing the data to a flash memory of the determined type. A flash manager and a flash storage device are provided.

18 Claims, 10 Drawing Sheets

DATA PLACEMENT BASED ON DATA PROPERTIES IN A TIERED STORAGE DEVICE SYSTEM

BACKGROUND

Flash memory is a nonvolatile memory that was developed from electrically erasable programmable read-only memory (EEPROM). NAND flash memory and NOR flash memory are available. NAND flash memory can be written or read in blocks or pages. Originally, each flash memory cell had one bit per cell. Now, flash memory is available in single level cell (SLC) and multilevel cell (MLC) types. The single level cell type of flash memory has one bit per cell (as on the original flash memory), and the multilevel cell flash memory types have more than one bit per cell. Generally, multilevel cell flash memory operates with each cell capable of multiple ranges of electrons trapped on a floating gate, multiple programming voltages, and multiple threshold voltages applied to a controlling gate within the flash memory cell. The number of bits per cell is a function of the number of ranges of programming voltages and threshold voltages, and corresponding numbers of electrons on the floating gate. One type of multilevel cell flash memory is available is referred to as triple level cell (TLC) flash memory, which has three bits per cell. Further types of multilevel cell flash memory may be developed.

Flash memory is attractive as a storage media due to the access speeds. The familiar USB (universal serial bus) flash drive is an example of portable storage that makes use of flash memory. Solid-state drives, such as a USB flash drive, usually use the NAND type of flash memory. Trade-offs in cost per bit, bit density per unit of area in an integrated circuit, error rates, long-term storage reliability, read disturb rates, read wear rates and write wear rates, among other considerations, affect the choice of which type of flash memory to use in a given application. Generally, a single type of flash memory is selected for use in a system, e.g., a thumb drive, a solid-state drive, or a combination hard drive and solid-state storage, and the system then has the advantages and disadvantages of that type of flash memory. It is within this context that the embodiments arise.

SUMMARY

In some embodiments, a method for managing flash memory is provided. The method includes determining at least one property of a data and determining to which type of a plurality of types of flash memory to write the data, based on the at least one property of the data. The plurality of types of flash memory includes at least two types of flash memory having differing numbers of bits per cell. The method includes writing the data to a flash memory of the determined type, wherein at least one action of the method is performed by a processor.

In some embodiments, a flash manager is provided. The flash manager includes a mapping unit, configured to place incoming data into one of a plurality of types of flash memory in accordance with one or more first properties of the incoming data. The mapping unit is configured to relocate data into one of the plurality of types of flash memory in accordance with one or more second properties of the data. The one or more first properties of the data are observable upon arrival of the incoming data, and the one or more second properties of the data are determined over time after arrival of the data. The plurality of types of flash memory includes a first type of flash memory having at least one bit per cell and a second type of flash memory having a greater number of bits per cell than the first type.

In some embodiments, a flash storage device is provided. The device includes a flash memory having at least a flash memory of a first type and a flash memory of a second type, wherein the first type of flash memory has a differing number of bits per cell from the second type of flash memory. The device includes a flash manager, having at least one processor configured to perform actions that include writing a first data to the flash memory of the first type responsive to the first data having a first property, and writing a second data to the flash memory of the second type responsive to the second data having a second property.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
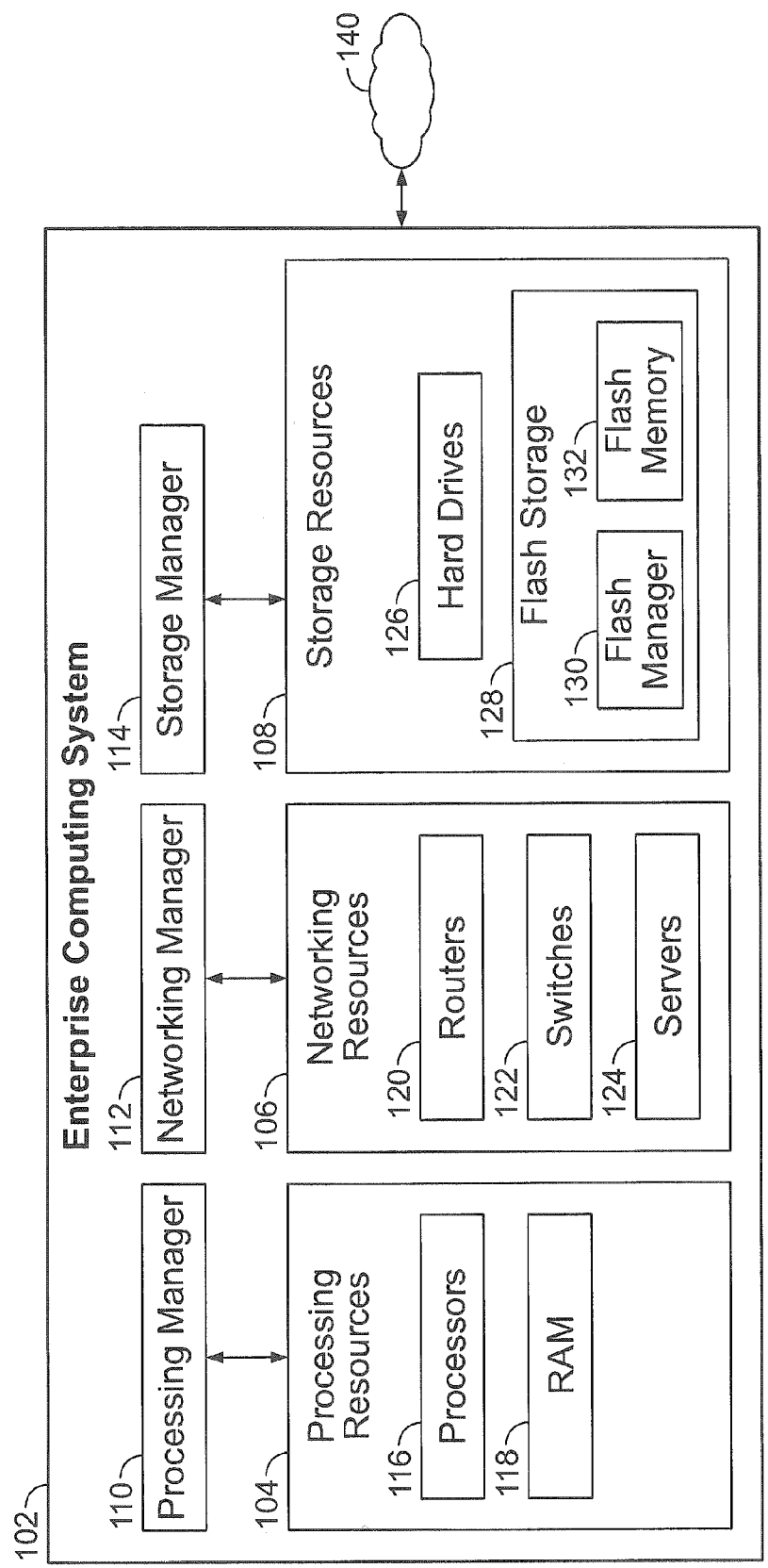
FIG. 1 is a system diagram showing an enterprise computing system, with processing resources, networking resources and storage resources, including flash storage, in accordance with some embodiments.

Combining two or more types of flash memory into a device or system is one way to increase capacity and reduce costs. Controlling data placement into each of the two or more types of flash memory, based on data properties, supports selection of a type of flash memory for the data placement depending on how the data is used in the system. Typically, in a comparison among single level cell, multilevel cell, and three bits per cell types of flash memory (three bits per cell flash being a type of multilevel cell flash that may be referred to as a triple level cell), the single level cell type of flash memory has the lowest density, the highest cost per bit, the longest data retention time, the fastest average write time, the lowest read error rate, the lowest susceptibility to read disturb and program disturb (write disturb) events and errors, the lowest read wear rate and the lowest write wear rate. Higher numbers of bits per cell reverse these trends, so that the three bits per cell type of flash memory has higher density, lower cost per bit, lower data retention time, slower average write time, higher read error rate, higher susceptibility to read disturb, higher susceptibility to program disturb, higher read wear rate, and higher write wear rate, as compared to the single level cell type of flash memory. The two bits per cell type of multilevel cell flash memory has data characteristics that reside between the single level cell and the triple level cell types of flash memory. Quad level cell (QLC) flash memory, having four bits per cell, or variants of flash with higher bit density per cell, i.e., greater than four bits per cell, may continue these trends. Such characteristics of types of flash memory, and particularly the values of various parameters relating to these characteristics, may vary among families of flash memory and among manufacturers, so that the specifics will be case dependent. Embodiments of a flash storage, a flash manager, and a related method for managing flash memory, determine placement of data into types of flash memory, in accordance with properties of the data and various policies. By making placement of the data dependent on properties of the data, these embodiments support use of multiple types of flash memory in a system. It should be appreciated that in some embodiments the data properties may be characterized as non-performance related properties of the different types of flash memory, i.e., properties not related to access times for the different flash memory types.

As will be discussed in more detail below, some embodiments place data in one type or another of flash memory according to data properties that are observable upon arrival of the data. Some embodiments relocate data to one type or another of flash memory according to data properties that are observable over time after arrival of the data. It should be appreciated that these aspects can be combined in some embodiments by placing data initially and then relocating data over time, as applicable. Properties of the data can be accounted for in metadata, which can be derived initially and/or derived from tracking the data. Policies affecting data placement in accordance with properties of the data can be embedded in memory or a storage unit associated with a device for the embodiments described herein. Various mechanisms, aspects and actions are further described below with reference to FIGS. 1-5.

FIG. 1 is a system diagram showing an enterprise computing system 102, with processing resources 104, networking resources 106 and storage resources 108, including flash storage 128, in accordance with an embodiment of the present disclosure. A flash manager 130 and flash memory 132 are included in the flash storage 128. The enterprise computing system 102 illustrates one environment suitable for deployment of the flash storage 128, although the flash storage 128 could be used in other computing systems or devices, larger or smaller, or in variations of the enterprise computing system 102, with fewer or additional resources. The enterprise computing system 102 is coupled to a network 140, such as the global communication network known as the Internet, in order to provide or make use of services. For example, the enterprise computing system 102 could provide cloud services, physical computing resources, or virtual computing services.

In the enterprise computing system 102, various resources are arranged and managed by various managers. A processing manager 110 manages the processing resources 104, which include processors 116 and random-access memory (RAM) 118. Other types of processing resources could be integrated, as the embodiment of FIG. 1 is one example and not meant to be limiting. A networking manager 112 manages the networking resources 106, which include routers 120, switches 122, and servers 124. Other types of networking resources could be included. A storage manager 114 manages storage resources 108, which include hard drives 126 and flash storage 128, as well as other types of storage resources. In some embodiments, the flash storage 128 completely replaces the hard drives 126. The enterprise computing system 102 can provide or allocate the various resources as physical computing resources, or in variations, as virtual computing resources supported by physical computing resources. For example, the various resources could be implemented using one or more servers executing software. Files or data objects, or other forms of data, are stored in the storage resources 108. In one embodiment, the hard drives 126 serve as archival storage, and the flash storage 128 serves as active storage. In some embodiments, the flash storage 128 serves at least in part as a cache memory. The flash manager 130 determines in which type of flash memory, in the flash memory 132, each portion of data should be stored. In some embodiments, the flash manager 130 determines whether, when, and into which type of flash memory, in the flash memory 132, some portions of data should be relocated.

Figure 2:
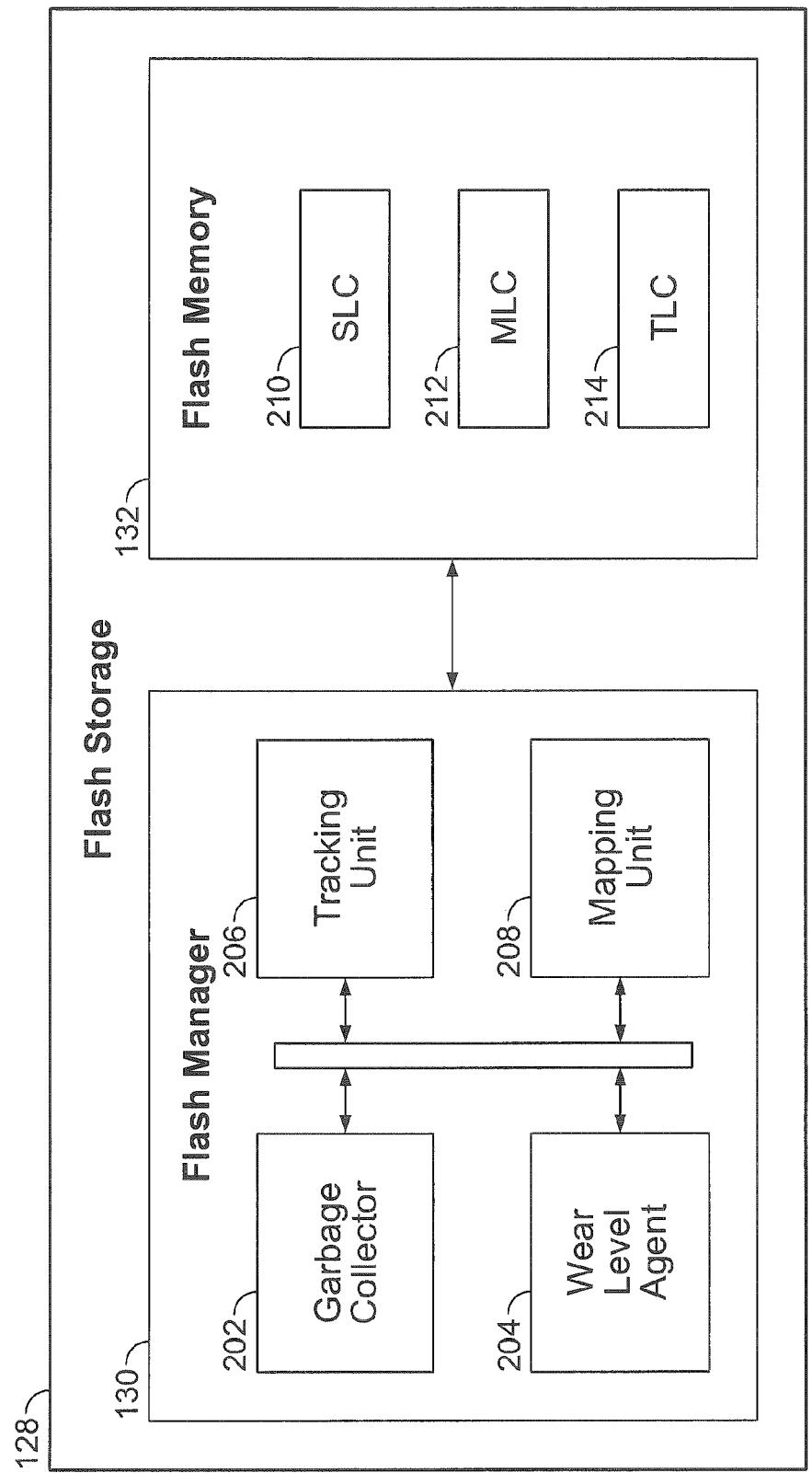
FIG. 2 is a system diagram showing an embodiment of the flash storage of FIG. 1, including a flash manager and multiple types of flash memory, in accordance with some embodiments.

FIG. 2 is a system diagram showing an embodiment of the flash storage 128 of FIG. 1, including a flash manager 130 and multiple types of flash memory 132. In this example, the flash memory 132 includes a single level cell type of flash memory 210, a multilevel cell type of flash memory 212, and a triple level cell type of flash memory 214. In further embodiments, the flash memory 132 includes two of these types of flash memory, one of these types of flash memory and one other type of flash memory, two other types of flash memory, or three or more types of flash memory, and so on. Characteristics of each of the types of flash memory influence the policies upon which the decisions of the flash manager 130 are based.

Still referring to FIG. 2, in order to perform various tasks, the flash manager 130 has a tracking unit 206, a mapping unit 208, a garbage collector 202 and a wear level agent 204. In further embodiments, the flash manager 130 has fewer or additional units therein. The mapping unit 208 determines where in the flash memory 132, i.e., into which of the types of flash memory 210, 212, 214, to write the data that arrives from various locations within the enterprise computing system 102, e.g., from the processing resources 104 and/or the networking resources 106. The tracking unit 206 tracks operations on the data in the flash memory 132, such as read operations, write operations and/or error corrections. In addition, tracking unit 206 provides information about these operations to the mapping unit, the garbage collector 202 and/or the wear level agent 204, for use in decisions thereof.

The garbage collector 202 of FIG. 2, reclaims blocks of flash memory, in coordination with the mapping unit 208. In some embodiments, the garbage collector 202 cooperates with the tracking unit 206. For example, a block in one of the types of flash memory 210, 212, 214 may have a low number of valid pages, e.g., below a specified threshold value. The garbage collector 202 moves the valid pages from the block being reclaimed, into one of the types of flash memory 210, 212, 214 in cooperation with the mapping unit 208. The valid pages are thus relocated, as part of the garbage collection process in this embodiment. The mapping unit 208, in this example, determines which of the types of flash memory 210, 212, 214 to move these valid pages to, based on one or more properties of the data. The relevant properties of the data could include one or more parameters as tracked by the tracking unit 206 since the arrival of the data into the flash memory 132. Once these valid pages are moved, e.g., by copying the data of these pages to the determined type of flash memory 210, 212, 214, verifying that the data reads correctly in the new location(s), and releasing the original locations of the valid pages, the block is reclaimed by the garbage collectors 202 and is available for new use. The reclaimed block of flash memory can then be erased and reused. In some embodiments, the garbage collector 202 and the mapping unit 208 are combined into one unit, i.e., integrated.

Continuing with FIG. 2, the wear level agent 204 produces even wear in blocks of flash memory, in coordination with the mapping unit 208. In some embodiments, the wear level agent 204 cooperates with the tracking unit 206. For example, the wear level agent 204 could determine that some pages in a block, or some blocks, in one of the types of flash memory 210, 212, 214 have been read a total number of times that exceeds a read count threshold value, or are being read at a rate that exceeds a read rate threshold value. An excessive number of reads may be likely to increase the likelihood of errors in the data itself, or may cause read disturb errors in data adjacent to the data. It should be appreciated that an excessive read rate may physically heat up the data cells on the integrated circuit, which can disturb the data, i.e., cause errors. The wear level agent 204 determines that some pages in a block, or some blocks, have produced a total number of errors during reads that exceeds a read error count threshold value, or are producing errors at a rate that exceeds a read error rate threshold value, e.g. are producing an error count over a specified period of time that implies a read error rate exceeding a read error rate threshold value. These pages, or these blocks, would be considered by the wear level agent 204 to have excessive wear. The wear level agent 204 then moves these pages or blocks, with excessive wear, from current locations in the flash memory 132 into one of the types of flash memory 210, 212, 214 in cooperation with the mapping unit 208. The pages or blocks are thus relocated, as part of the wear leveling process in this embodiment. The mapping unit 208, in this example, determines which of the types of flash memory 210, 212, 214 to move these pages or blocks to, based on one or more properties of the data. The relevant properties of the data could include one or more parameters as tracked by the tracking unit 206 since the arrival of the data into the flash memory 132. Once these pages or blocks are moved, e.g., by copying the data of these pages or blocks to the determined type of flash memory 210, 212, 214, verifying that the data reads correctly in the new location(s), and releasing the original locations of the pages or blocks, the wear level agent 204 can monitor the data in the new location and monitor new data in the earlier location.

As a further example, the wear level agent 204 of FIG. 2 could determine that some pages in a block, or some blocks, in one of the types of flash memory 210, 212, 214 have been written a total number of times that exceeds a write count threshold value, or are being written at a rate that exceeds a write rate threshold value. An excessive number of writes may be likely to increase the likelihood of errors in the data itself, or may cause write disturb errors in data adjacent to the data, i.e., in cells adjacent to the cells being written. An excessive write rate may physically heat up the data cells on the integrated circuit, which can disturb the data, i.e., cause errors. The wear level agent 204 could determine that some pages in a block, or some blocks, have produced a total number of errors during writes that exceeds a write error count threshold value, or are producing errors at a rate that exceeds a write error rate threshold value, e.g. are producing an error count over a specified period of time that implies a write error rate exceeding a write error rate threshold value. These pages, or these blocks, would be considered by the wear level agent 204 to have excessive wear. The wear level agent 204 then moves these pages or blocks, with excessive wear, from current locations in the flash memory 132 into one of the types of flash memory 210, 212, 214 in cooperation with the mapping unit 208. The pages or blocks are thus relocated, as part of the wear leveling process in this embodiment. The mapping unit 208, in this example, determines which of the types of flash memory 210, 212, 214 to move these pages or blocks to, based on one or more properties of the data. The relevant properties of the data could include one or more parameters as tracked by the tracking unit 206 since the arrival of the data into the flash memory 132. Once these pages or blocks are moved, e.g., by copying the data of these pages or blocks to the determined type of flash memory 210, 212, 214, verifying that the data reads correctly in the new location(s), and releasing the original locations of the pages or blocks, the wear level agent 204 can monitor the data in the new location and monitor new data in the earlier location.

It should be appreciated that the wear level agent 204 of FIG. 2 can apply thresholds specific to various types of flash memory. For example, flash memory having a lower number of bits per cell could have a lower read error rate threshold value than flash memory having a greater number of bits per cell. By cooperating with the mapping unit 208 and the tracking unit 206, the wear level agent 204 can determine whether an observed read error rate indicates excessive wear in a given page or block of a specific type of flash memory, in which case the data could be moved to a differing block in the same type of flash memory, or whether the observed read error rate is consistent with that type of flash memory and indicates the data should be relocated to a type of flash memory having a generally lower read error rate. Such determination could take into account one or more static properties of the data, as well as one or more dynamic properties of the data, and corresponding policies. The wear level agent 204 could apply thresholds that differ from thresholds applied by the mapping unit 208, in the above and other scenarios. Thresholds could apply to time, or to numbers of operations in some embodiments. For example a read error rate and corresponding threshold value could apply to a number of read errors per total number of reads, or a number of read errors over a length of time. Thresholds and rates can be implemented as parameters in some embodiments.

Figure 3:
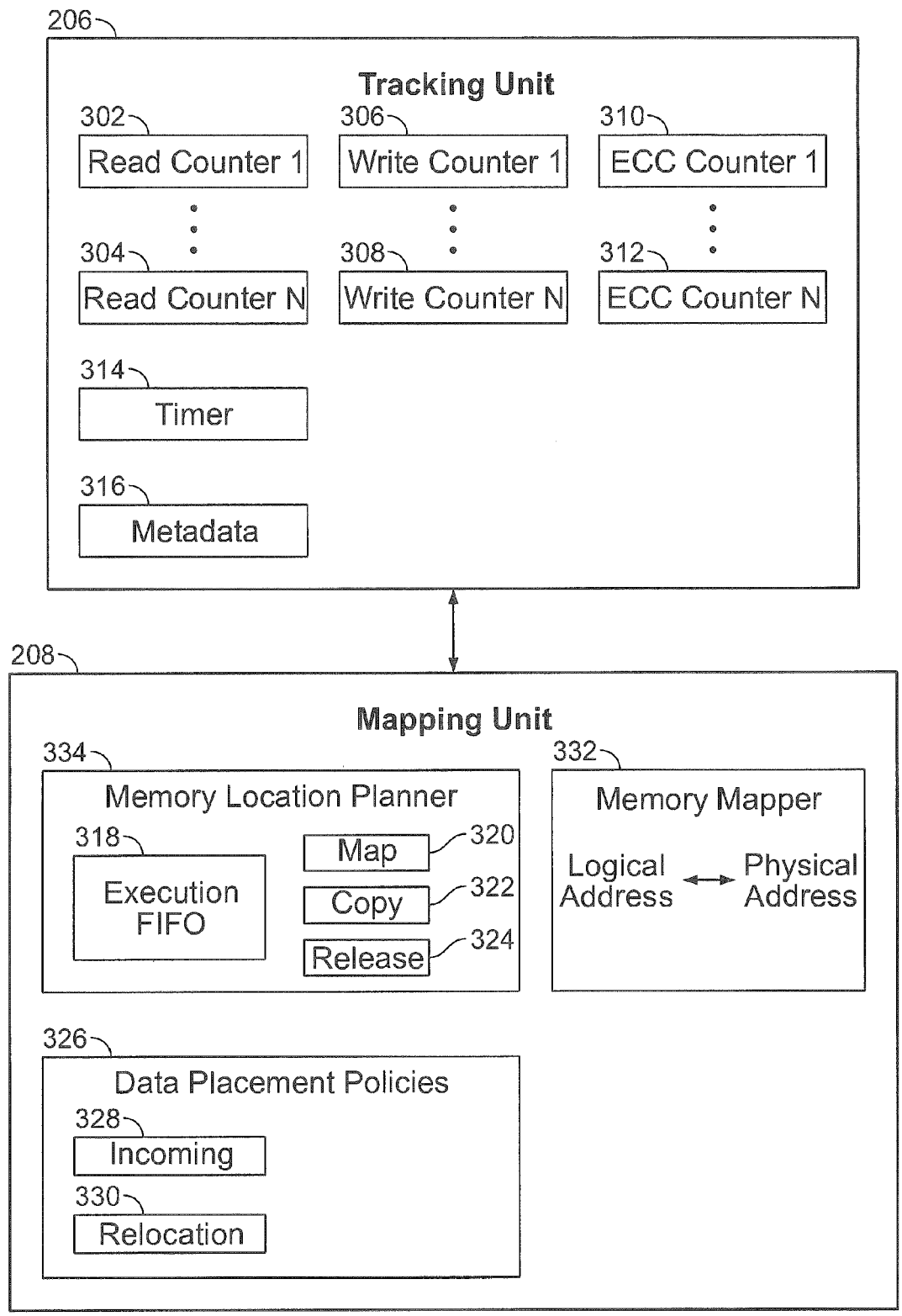
FIG. 3 is a system diagram showing a tracking unit and a mapping unit in an embodiment of the flash manager of FIG. 2, in accordance with some embodiments.

FIG. 3 is a system diagram showing a tracking unit 206 and a mapping unit 208 in an embodiment of the flash manager 130 of FIG. 2. The tracking unit 206 tracks various properties of the data. In some embodiments, some or all of the properties are indicated in metadata 316. For example, a first type of property is observable upon arrival of the data. The tracking unit 206 could determine a file type or an object type of the data, and write this information into the metadata 316. An operating system or other portion of the enterprise computing system 102 could send along metadata with the file or the data, and this metadata could be written into the metadata 316 in the tracking unit 206 in some embodiments. Metadata 316 could indicate whether data is, includes at least a portion of, or is included in a text file, an operating system file, an image file, e.g. photographs, video or movies, a temporary file, an archive file, backup data, deduplicated backup data, and so on. Metadata 316 could indicate a read count of the data, a write count of the data, an error count of reads of the data, a count of a number of discards of the data during deduplication, a time interval from when the data was written, and so on.

A second type of property is observable over time, after the arrival of the data. For example, the tracking unit 206 of FIG. 3 could keep track of the number of times data is read, written to, or produces errors, and/or time intervals over which these events occur. Counters and timers could be implemented in hardware, firmware or software, or a single timer or a single counter could be used and count values or time values could be written into memory locations, for example in the metadata 316. In the embodiment shown, the tracking unit 206 has read counters 302, 304 (e.g., read counter 1 through read counter N), for counting the number of times a data page, a data block or other amount of data is read. The tracking unit 206 has write counters 306, 308 (e.g., write counter 1 through write counter N), for counting the number of times a data page, a data block or other amount of data is written to. The tracking unit 206 has error correction code (ECC) counters 310, 312 (e.g., ECC counter 1 through ECC counter N), for counting the number of times a data page, a data block or other amount of data produces an error during a read, where the error is corrected through application of an error correction code. The tracking unit 206 has a timer 314, for timing intervals. For example, the timer 314 could be applied to establish the beginning and end of a time interval, during which time interval reads, writes or errors are counted to determine a read rate, a write rate or an error rate. The determined read rate, write rate, or error rate can then be recorded in the metadata 316, and used for comparison with a read rate threshold, a write rate threshold, or an error rate threshold. As a further use, the timer 314 could be applied to measure an interval between reads, an interval between writes, or a time interval establishing how long data has resided at a specified location in memory.

In the mapping unit 208, a memory location planner 334, data placement policies 326, and a memory mapper 332 cooperate, to place incoming data and/or relocate data, in accordance with properties of the data. Planning for where to locate data, i.e., in which of the types of flash memory 210, 212, 214 to place or relocate the data, is handled by the memory location planner 334, in accordance with the properties of the data, from the tracking unit 206, and the data placement policies 326. Data placement policies 326 include incoming data placement policies 328, and relocation data placement policies 330. The memory mapper 332 keeps track of where the data is placed, whether initially or through relocation, by maintaining a map between logical addresses and physical addresses of the data.

In the embodiment shown in FIG. 3, the memory location planner 334 includes an execution FIFO (first in first out) 318, a map unit 320, a copy unit 322, and a release unit 324. In various embodiments, the memory location planner 334 could be event driven, responding to the arrival of incoming data or notifications from the tracking unit 206, could be polling-based, conducting polls and responding to results of the polls, could be sequentially scanning through the flash memory or through the metadata 316, or could proceed in some other manner consistent with the teachings herein. For purposes of illustration, examples of incoming data and data to be relocated are discussed below to further illustrate embodiments. Following these example illustrations and discussions, the data placement policies 326 will be further discussed, with numerous examples thereof.

Referring to FIGS. 2 and 3, the memory location planner 334 looks at first properties or static properties of incoming data, i.e., those properties of the data that are observable upon arrival of the data. Static properties are unchanging over the lifespan of the data, e.g., an operating system file is always an operating system file, an image file always has at least one image, a text file is always text. It should be appreciated that any exceptions to this could be handled by exception policies. The memory location planner 334 consults with the incoming data placement policies 328, which could include instructions or directions as to which type of flash memory 210, 212, 214 (see FIG. 2) to write data having a specified property or properties upon arrival. Next, the memory location planner 334 determines which physical address or addresses are available in the determined type of flash memory 210, 212, 214, by applying the map unit 320 in coordination with the memory mapper 332. The memory location planner 334 then places the determined physical address or addresses in the execution FIFO 318. In some embodiments, the incoming data is placed into the execution FIFO 318 along with the address or addresses to which the data will be written. In other embodiments, the incoming data is placed into a separate data FIFO, as readily devised. Further mechanisms for temporarily holding the data are readily apparent. The execution FIFO 318 writes the data to the address in the selected type of flash memory 210, 212, 214, in the order in which the direction to so write is received, i.e., first-in first-out. The memory mapper 332 tracks these data writes, updating a map of logical addresses and physical addresses accordingly. Memory mapping, via the memory mapper 332, is applied whenever data is written to or read from the flash storage 128, e.g., when an I/O operation is requested on the storage resources and the flash storage 128, by a component in the enterprise computing system of FIG. 1, or when the mapping unit 208 initially locates or later relocates data. In some embodiments, the I/O operation specifies a logical address for the data being requested, and the memory mapper would find the physical address, i.e., where the data is physically located in the flash memory 132. Other sequences for writing data, tracking where the data is written, mapping the data, and mechanisms for doing so, are readily devised in accordance with the teachings disclosed herein. In some embodiments, the data is placed directly, and an execution FIFO 318 is optional. In some embodiments, the execution FIFO 318 is replaced by another type of scheduling device such as a stack or a queue.

With the data to be relocated, the memory location planner 334 looks at second properties or dynamic properties of the data, i.e., those properties of the data that are tracked over time by the tracking unit 206. Dynamic properties may change over the lifespan of the data, e.g., a file may be read more times or fewer times over an interval or a lifespan, data may have fewer errors or more errors during reads over an interval or a lifespan, data may be written to a specified address more often or less often or more times or fewer times over an interval or a lifespan, and so on. The memory location planner 334 consults with the relocation data placement policies 330, which could include instructions or directions as to which type of flash memory 210, 212, 214 to write data having a specified property or properties determined after arrival of the data, and could include parameter values such as thresholds to be applied to the properties as tests. Next, the memory location planner 334 determines which physical address or addresses are available in the determined type of flash memory 210, 212, 214, by applying the map unit 320 in coordination with the memory mapper 332. The memory location planner 334 then places the determined physical address or addresses in the execution FIFO 318. The execution FIFO 318 copies the data from the current address to the new address in the selected type of flash memory 210, 212, 214, in the order in which the direction to so write is received, i.e., first-in first-out. This action happens via the copy unit 322, which also verifies that the data was written correctly prior to releasing the earlier address via the release unit 324. Differences between placing arriving data and relocating data could be handled by setting a flag in the execution FIFO 318 or through other mechanisms as readily devised. In some embodiments, the data is relocated directly, and an execution FIFO 318 is not needed. The memory mapper 332 tracks the data writes, updating a map of logical addresses and physical addresses accordingly. In some embodiments, additional layers of memory mapping and addresses are applied.

As mentioned above with regard to FIG. 3, the data placement policies 326 include incoming data placement policies 328 and relocation data placement policies 330, in some embodiments. In further embodiments, the data placement policies 326 are combined, not separate. In some embodiments, the incoming data placement policies 328 moderate or even override some or all of the relocation data placement policies 330 in some circumstances as discussed below. It should be appreciated that the data placement policies 326 are not limited to the examples described herein, and further data placement policies 326 can be developed and applied in further embodiments. Particularly, policies could apply rates in place of counts, or counts in place of rates, or could apply both. It should be further appreciated that data placement policies 326 applying to types of flash memory with differing numbers of levels per cell may be interpreted as or have corresponding data placement policies applying to types of flash memory with differing characteristics relative to data, and vice versa.

One policy is writing text data to a type of flash memory having a lower read error rate and writing image data to a type of flash memory having a higher read error rate. This policy could be interpreted as, or replaced by a policy of writing text data to a type of flash memory having a lower number of bits per cell and writing image data to a type of flash memory having a higher number of bits per cell. This policy could also be written as two policies, one for text data and one for image data.

Another policy is writing data having a number of discards during deduplication, which number of discards meets a deduplication threshold value, to the type of flash memory having the lower read error rate. For example, a backup run employing deduplication could encounter a large number of duplicate blocks of data. One copy of such a block of data could be written to the type of flash or nonvolatile memory having the lower read error rate, and the large number of duplicate blocks could then be discarded, as an action of deduplication. It should be appreciated that if k copies of the same block of data were removed, one might expect that block of data to be read at a rate k times higher than "normal." This policy could be interpreted as, or replaced by a policy of writing data having a number of discards during deduplication, meeting a deduplication threshold value, to the type of flash memory having the lower number of bits per cell. Data that has a high number of discards during deduplication, e.g., during a backup operation with deduplication, is likely to have a high number of reads during a restore operation. Accordingly, placing such data in the type of flash memory with the lower read error rate is consistent with the data being read more frequently or a larger total number of times.

Yet another policy is placing data in the type of flash memory having the higher read error rate in response to the data having a single instance during deduplication. Data that has only a single instance, i.e., data that does not have discards during a backup operation with deduplication, is likely to be read only once during a restore operation. Thus, placing such data in the type of flash memory with a higher read error rate may still be safe, considering that the data will not be read frequently or a large number of times.

The data placement policies may include a policy to move data from the type of flash memory having the higher read error rate to the type of flash memory having the lower read error rate in response to the data having a cumulative number of read errors exceeding a read error threshold value. This policy could be interpreted as, or replaced by a policy of moving data from the type of flash memory having the higher number of bits per cell to the type of flash memory having the lower number of bits per cell in response to the data having a cumulative number of read errors exceeding a read error threshold.

Another policy is moving data from the type of flash memory having the higher read error rate to the type of flash memory having the lower read error rate in response to the data having a rate of read errors exceeding a read error rate threshold value. This policy could be interpreted as, or replaced by a policy of moving data from the type of flash memory having the higher number of bits per cell to the type of flash memory having the lower number of bits per cell in response to the data having a rate of read errors exceeding a read error rate threshold.

One policy is moving data from a type of flash memory having a lower read cycle endurance to a type of flash memory having a higher read cycle endurance in response to the data having a cumulative number of reads exceeding a read count threshold value. This policy could be interpreted as, or replaced by a policy of moving data from the type of flash memory having the higher number of bits per cell to the type of flash memory having the lower number of bits per cell in response to the data having a cumulative number of reads exceeding a read count threshold.

Another data placement policy includes a policy to move data from the type of flash memory having the higher read error rate to the type of flash memory having the lower read error rate in response to the data having a read rate exceeding a read rate threshold. This policy could be interpreted as, or replaced by a policy of moving data from the type of flash memory having the higher number of bits per cell to the type of flash memory having the lower number of bits per cell in response to the data having a read rate exceeding a read red threshold value.

One policy is moving data from a type of flash memory having a lower write cycle endurance to a type of flash memory having a higher write cycle endurance in response to the data having a cumulative number of writes exceeding a write count threshold value. This policy could be interpreted as, or replaced by a policy of moving data from the type of flash memory having the higher number of bits per cell to the type of flash memory having the lower number of bits per cell in response to the data having a cumulative number of writes exceeding a write count threshold value. This write count threshold value could match the write limit (i.e., the write cycle endurance) published by a manufacturer of a given type of flash memory, or could be set at some other value, e.g., conservatively lower.

One policy is moving data from the type of flash memory having the lower write cycle endurance to the type of flash memory having the higher write cycle endurance in response to the data having a write rate exceeding a write rate threshold value. This policy could be interpreted as, or replaced by a policy of moving data from the type of flash memory having the higher number of bits per cell to the type of flash memory having the lower number of bits per cell in response to the data having a write rate exceeding a write rate threshold value.

One policy is moving data from a type of flash memory having a lower retention time to a type of flash memory having a higher retention time in response to a data residence time of the data exceeding a residence time threshold value. This policy could be interpreted as, or replaced by a policy of moving data from the type of flash memory having the higher number of bits per cell to the type of flash memory having the lower number of bits per cell in response to a data residence time of the data exceeding a residence time threshold value.

Figure 4A:
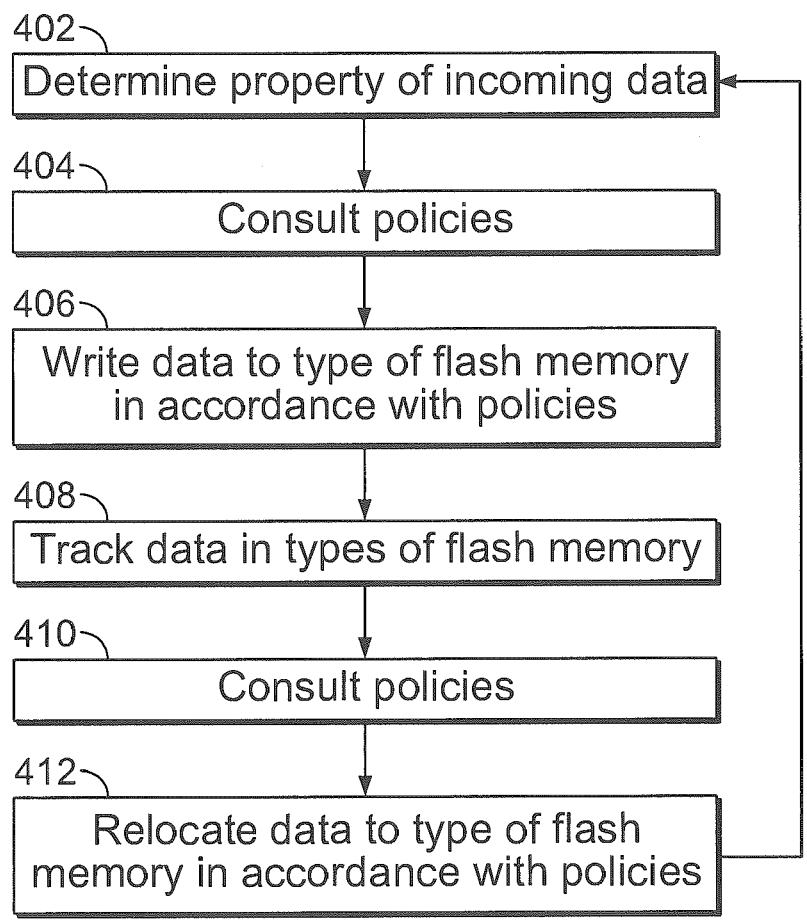
FIG. 4A is a flow diagram showing a method for managing flash memory, which can be practiced on or by embodiments of the enterprise computing system, the flash storage, and the flash manager of FIGS. 1-3, in accordance with some embodiments.
Figure 4B:
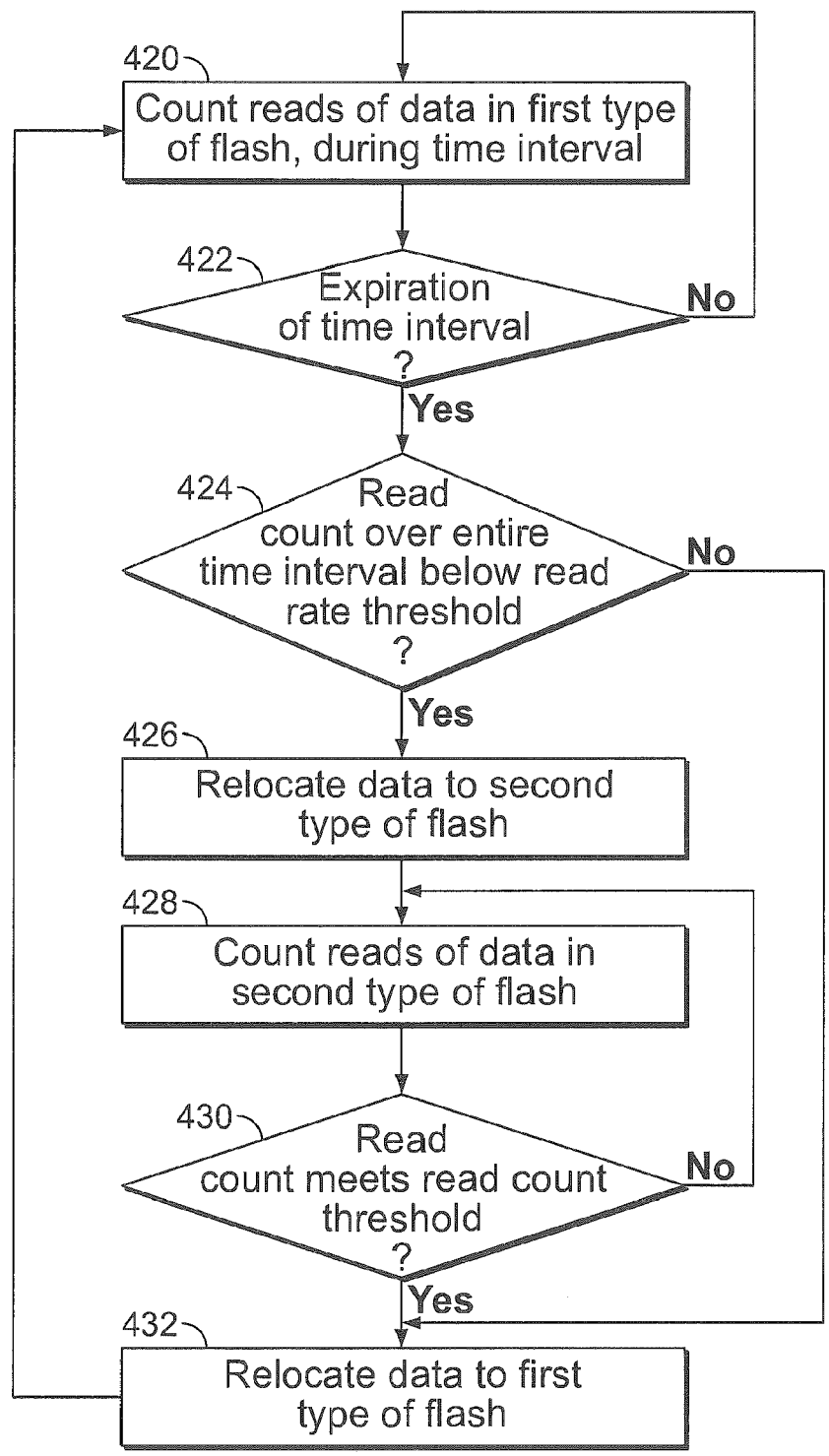
FIG. 4B is a flow diagram of a method for managing flash memory, applying a read rate threshold and a read count threshold, in accordance with some embodiments.
Figure 4C:
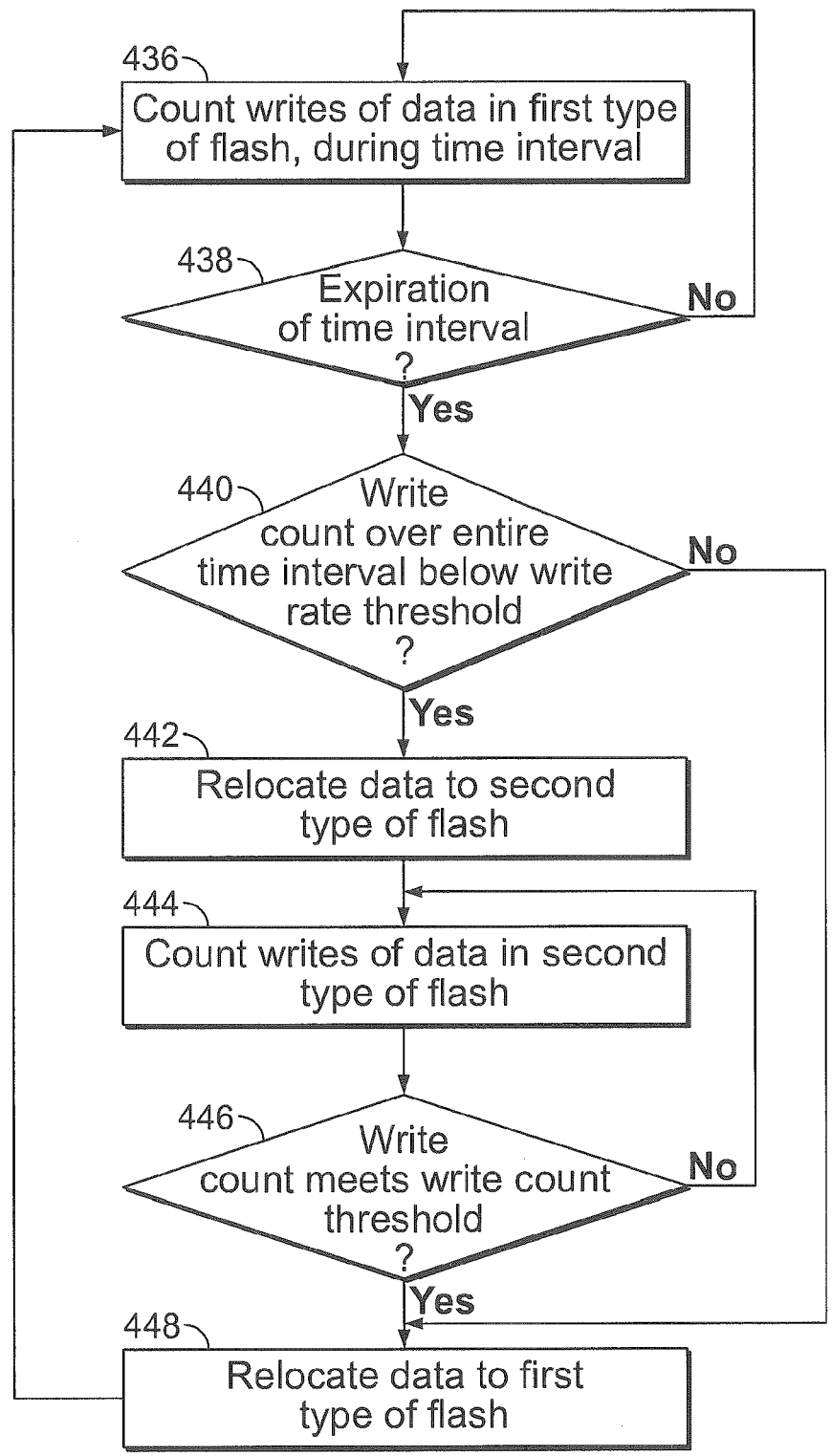
FIG. 4C is a flow diagram of a method for managing flash memory, applying a write rate threshold and a write count threshold, in accordance with some embodiments.
Figure 4D:
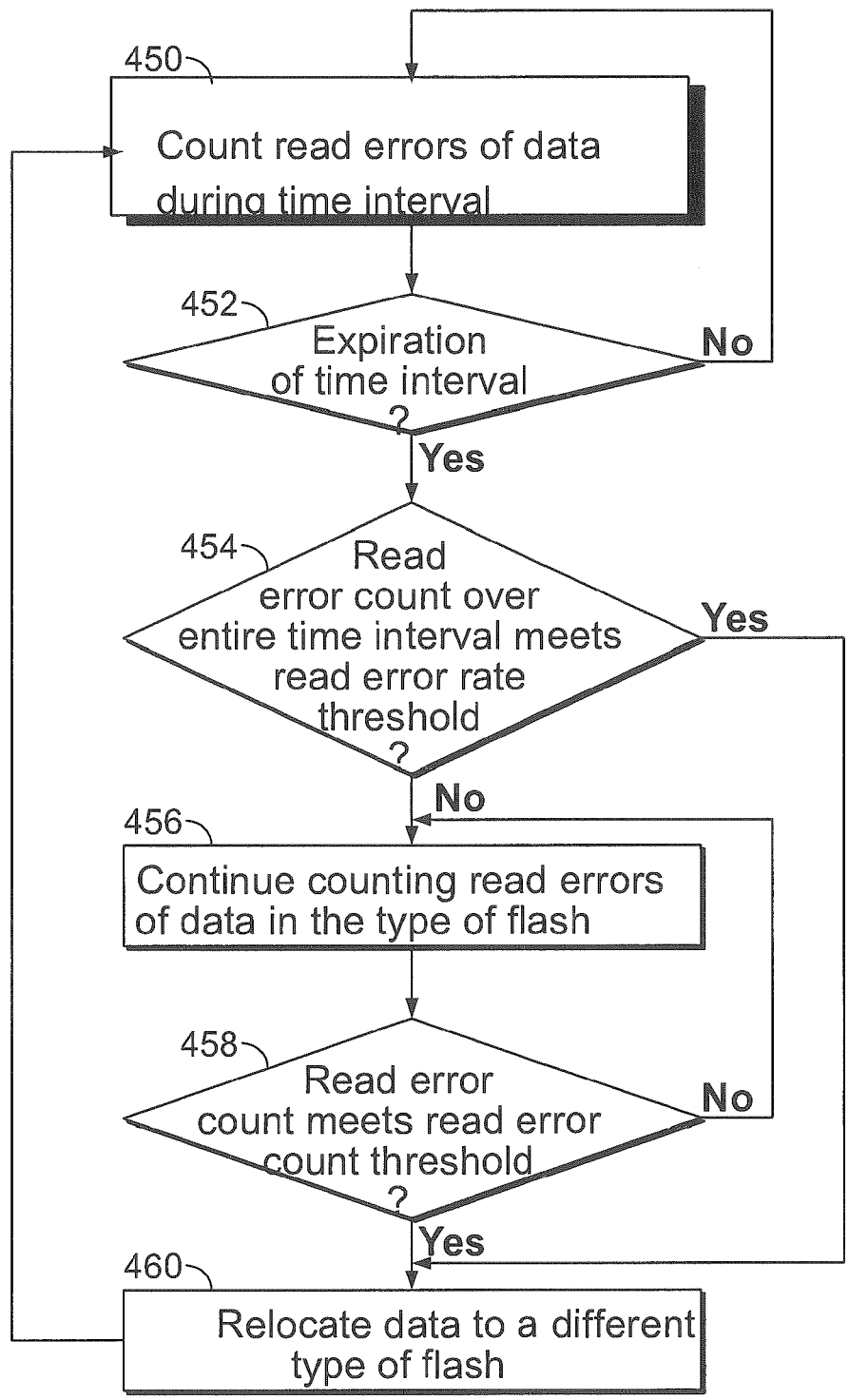
FIG. 4D is a flow diagram of a method for managing flash memory, applying an error count threshold and an error rate threshold, in accordance with some embodiments.
Figure 4E:
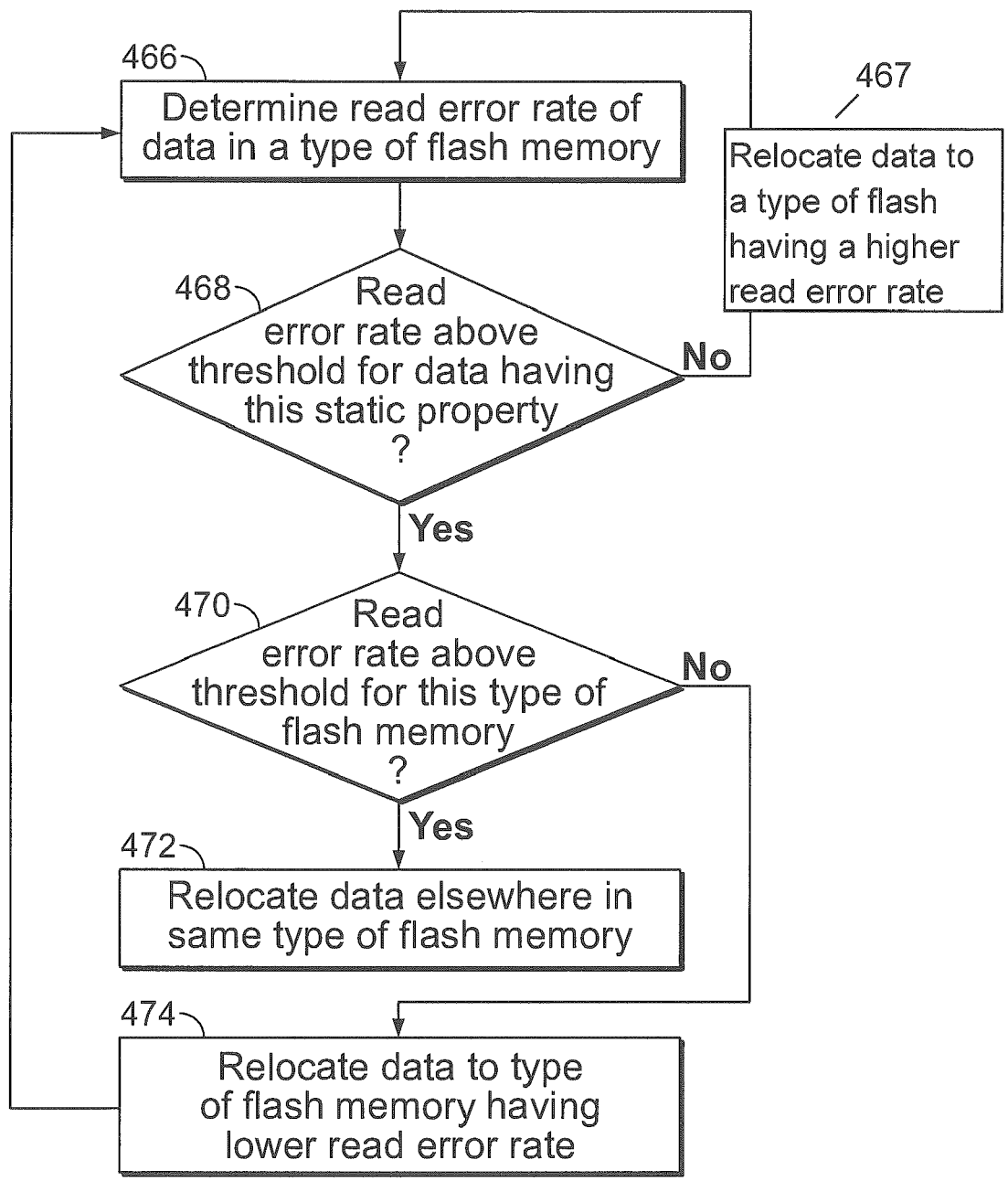
FIG. 4E is a flow diagram of a method for managing flash memory, applying thresholds relating to properties of data and memory, in accordance with some embodiments.
Figure 4F:
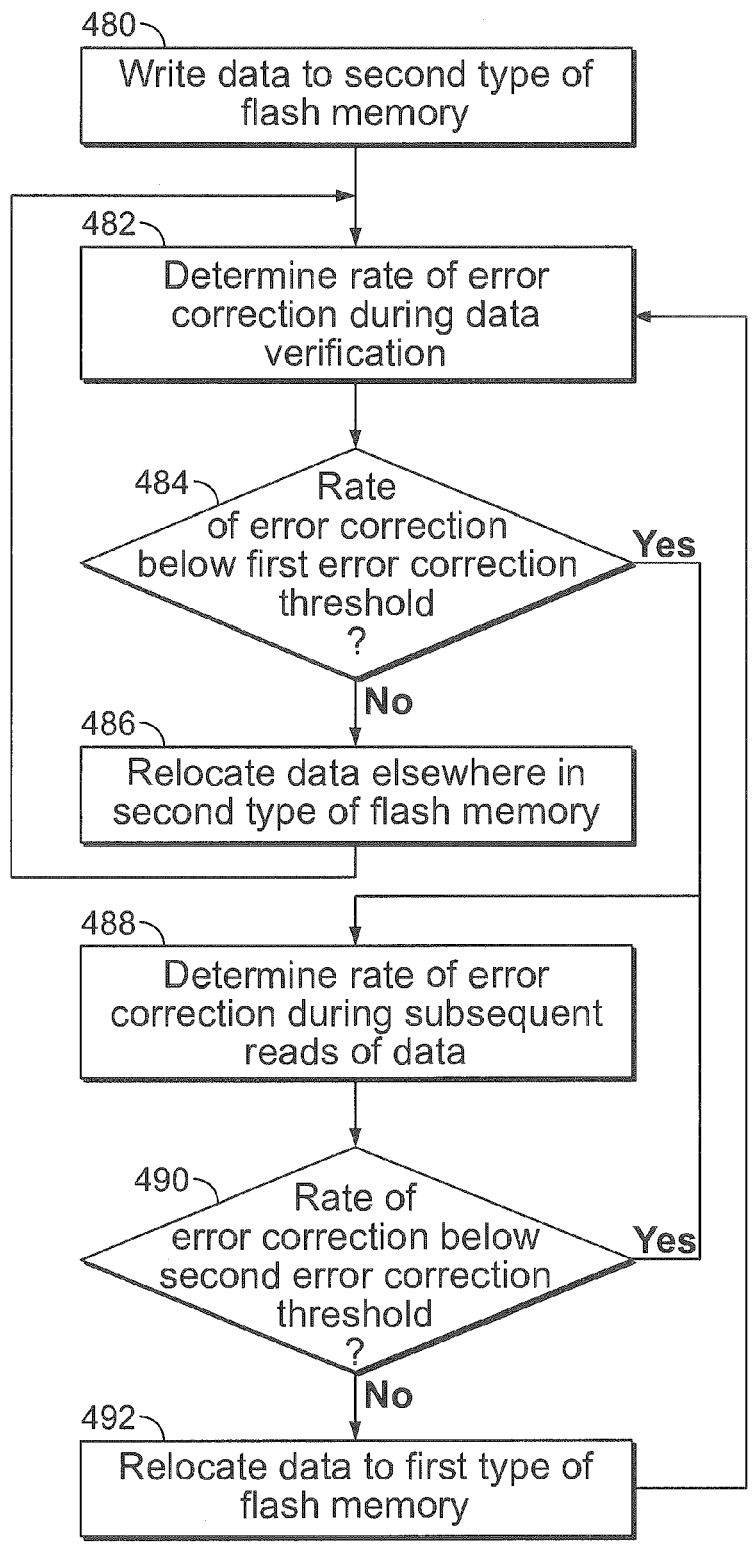
FIG. 4F is a flow diagram of a method for managing flash memory, applying differing error correction thresholds for data verification and long-term reads, in accordance with some embodiments.
Figure 5:
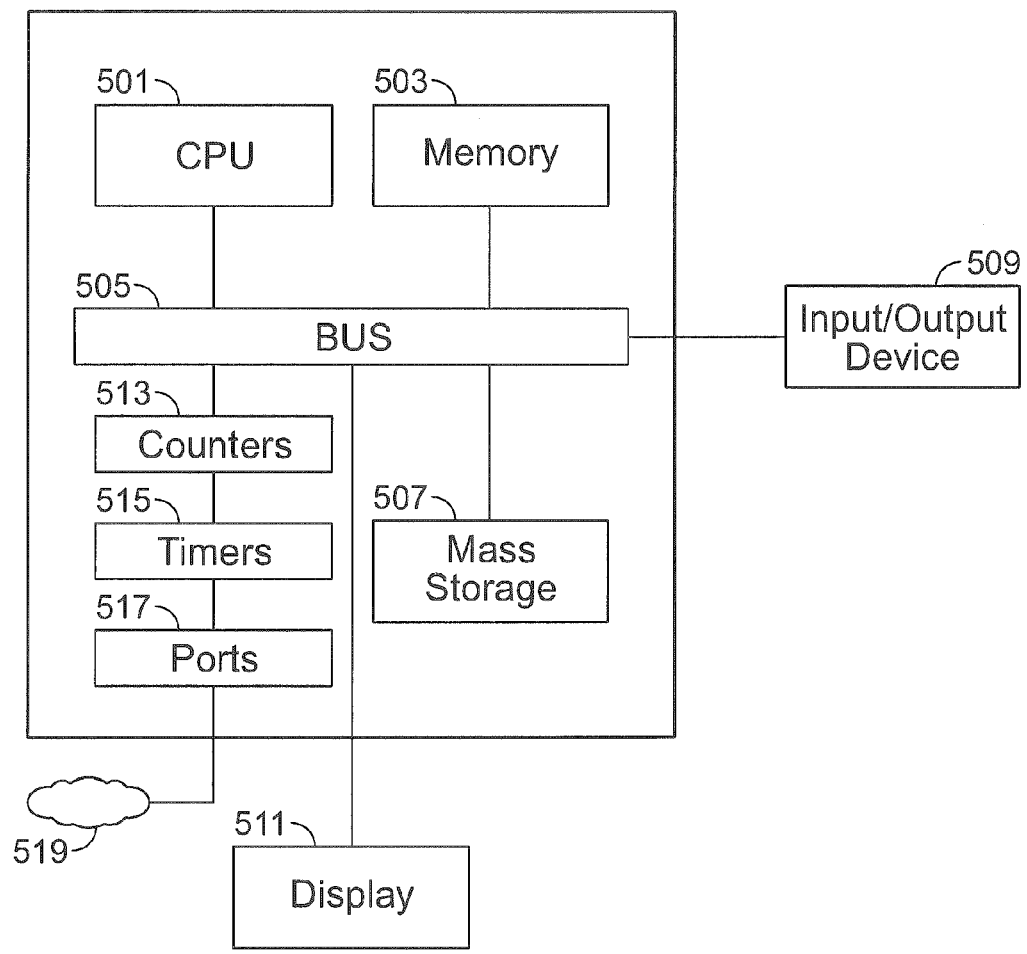
FIG. 5 is an illustration showing an exemplary computing device which may implement the embodiments described herein, in accordance with some embodiments.

FIGS. 4A-4F are flow diagrams showing various methods for managing flash memory, which can be practiced on or by embodiments of the enterprise computing system 102, the flash storage 128, and the flash manager 130 of FIGS. 1-3, or the computing device of FIG. 5. It should be appreciated that further embodiments combine portions from one or more of these flow diagrams, in accordance with the teachings disclosed herein. For example, one embodiment of the method includes portions of the flow diagrams shown in FIGS. 4B-4D implementing portions of the flow diagram shown in FIG. 4A.

FIG. 4A is a flow diagram showing a method for managing flash memory. The method applies properties of the data, and policies regarding properties of the data, to direct placement of data and relocation of data into various types of flash memory. A property of incoming data is determined, in an action 402. For example, a determination could be made as to whether the data includes an image, a temporary file, an operating system file or a type of object, or whether the data is a single instance of data from deduplication or a multiple instance data from deduplication, etc.

Policies are consulted, in an action 404. For example, incoming data placement policies could be consulted. These policies could include instructions or directions as to which type of flash memory to write data having particular properties. These policies could relate to data properties that are observable upon arrival of the data in some embodiments. Data is written to a type of flash memory in accordance with the policies, in an action 406. For example, data having a particular property could be written to a specified type of flash memory in accordance with a policy directing to do so for such data.

Data is tracked in various types of flash memory, in an action 408. For example, data could be tracked in two or more types of flash memory. Tracking could include counting the number of reads of the data, the number of writes of the data, the number of errors during reads of the data, establishing a time interval or window during which to count, and so on. Results from tracking could be written into the metadata, for use in comparison with the policies. Policies are consulted, in an action 410. For example, relocation data placement policies as described above could be consulted. These policies could include instructions or directions as to which type of flash memory to write data having particular properties based on tracking the data in the action 408.

Data is relocated to a type of flash memory in accordance with the policies, in an action 412. For example, the properties based on tracking, and the relocation data placement policies that are consulted, could lead to the decision to relocate the data to a particular type of flash memory, i.e., the decision of which type of flash memory to which to relocate the data is based on the tracked properties and the relocation data placement policies. It should be appreciated that the above-discussed method and variations thereof can be performed independently of, without, or in cooperation with wear leveling and/or garbage collection.

FIG. 4B is a flow diagram of a method for managing flash memory, applying a read rate threshold and a read count threshold. The method shown in FIG. 4B applies a dynamic property of the data, namely a count of the number of times the data is read, and a policy relating to the dynamic property of the data and types of flash memory, to direct placement of the data into various types of flash memory. Reads of data are counted in a first type of flash memory, during a time interval, in an action 420. For example, the tracking unit could dedicate a read counter and a timer to track the number of reads and the time interval, recording results in the metadata.

In a decision action 422, a question is asked, is this the expiration of the time interval? If the answer is no, the time interval has not expired, flow branches back to the action 420 to continue counting the reads of the data. If the answer is yes, the time interval has expired, the flow branches to the decision action 424. In the decision action 424, a question is asked, is the read count over the entire time interval below a read rate threshold? For example, dividing the read count by the time interval provides a read rate, which could be compared to a predetermined read rate threshold associated with the type of flash memory in which the data resides. If the answer is no, the read count over the entire time interval is not below the read rate threshold, the flow branches to the action 432 in order to relocate the data elsewhere in the first type of flash memory, i.e., in the same type of flash memory. Such an event could occur when the read rate of the data is too high, and there is concern that a read disturb error could occur. Relocating the data elsewhere in the same type of flash memory would stop or decrease the influence of the repeated reads on the neighboring cells of the original location of the data. This could be performed as a function of wear leveling in some embodiments. If the answer is yes in decision action 424, the read count over the entire time interval is below the read rate threshold, flow branches to the action 426. In a further embodiment, a decision could be made as to which type of flash to relocate to, based on a total read count, once a read rate has been exceeded. For example, after action 424 where it has been determined that the read rate threshold has been exceeded, the method may determine if the read count threshold has been exceeded and then proceed to determine the type of flash or nonvolatile memory to relocate the data to. In some embodiments, after action 424 where it has been determined that the read rate threshold has been exceeded, the method may determine the type of flash or nonvolatile memory from a plurality of types of flash or nonvolatile memory and is not limited to a single second type of flash or nonvolatile memory as FIG. 4B is one example and not meant to be limiting.

The data is relocated to a second type of flash, in the action 426. This could occur because the data has a low read rate, and can be relocated to a type of flash memory that is safe, i.e., unlikely to generate read disturb errors, for a lower read rate in some embodiments. The reads of data in the second type of flash are counted, in an action 428. For example, the tracking unit could dedicate a read counter to counting the reads of the data. In a decision action 430, a question is asked, does the read count meet the read count threshold value for the second type of flash memory? For example, the second type of flash memory could have a lower read count threshold value than the first type of flash memory, and the read count from the tracking unit is compared to this read count threshold value. If the answer is no, the read count does not yet meet the read count threshold value, the flow branches back to the action 428, to continue counting reads of the data in the second type of flash memory. If the answer is yes, the read count meets the read count threshold, the flow branches to the action 432.

The data is relocated to the first type of flash memory, in the action 432. This could occur because the data has been read a total number of times greater than is safe for reading data in the second type of flash memory, and read errors (or excessive numbers of read errors) might start occurring if the data is not soon moved. In further embodiments, the write counts could be applied to independent pieces of data. Write rates could be applied in place of write counts, and vice versa.

FIG. 4C is a flow diagram of a method for managing flash memory, applying a write rate threshold and a write count threshold. The method shown in FIG. 4C applies a dynamic property of the data, namely how many times the data is written, and a policy relating thereto, to direct placement of the data into various types of flash memory. Writes of the data into a first type of flash memory are counted during a time interval, in an action 436. For example, the tracking unit could dedicate a write counter and a timer to track the number of writes and the time interval, recording results in the metadata. Some of the data could be changing, and some of the data could be the same or unchanging, for example when a portion of a file is edited and the file is saved, and the counter could be tracking writes of data to a physical address or a range of physical addresses in a type of flash memory (or tracking the logical addresses with translation via the memory mapper).

A question is asked, in a decision action 438, is this the expiration of the time interval? If the answer is no, the time interval has not expired, the flow branches back to the action 436, to continue counting the writes of the data. If the answer is yes, the time interval has expired, the flow branches to the decision action 440. In the decision action 440, the question is asked, is the write count over the entire time interval below the write rate threshold value? For example, dividing the write count by the time interval provides a write rate, which could be compared to a predetermined write rate threshold associated with the type of flash memory in which the data resides. If the answer is no, the write count over the entire time interval is not below the write rate threshold value, the flow branches to the action 448 in order to relocate the data elsewhere in the first type of flash memory, i.e., in the same type of flash memory. Such an event could occur when the write rate of the data is too high, and there is concern that a write disturb error could occur. Relocating the data elsewhere in the same type of flash memory would stop or decrease the influence of the repeated writes on the neighboring cells of the original location of the data. This could be performed as a function of wear leveling in some embodiments. If the answer is yes in decision action 440, the write count over the entire time interval is below the write rate threshold, flow branches to the action 442.

The data is relocated to a second type of flash, in the action 442. This could occur because the data has a low write rate, and can be relocated to a type of flash memory that is safe, i.e., unlikely to generate write disturb errors, for a lower write rate. The writes of the data in the second type of flash memory are counted, in an action 444. For example, the tracking unit could dedicate a write counter to counting the writes of the data.

A question is asked, in a decision action 446, does the write count meet the write count threshold value for the second type of flash memory? For example, the second type of flash memory could have a lower write count threshold value than the first type of flash memory, and the write count from the tracking unit is compared to this write count threshold value. If the answer is no, the write count does not yet meet the write count threshold value, the flow branches back to the action 444, to continue counting writes of the data in the second type of flash. If the answer is yes, the write count does meet the write count threshold value, flow branches to the action 448. In the action 448, the data is relocated to the first type of flash. This could occur because the data has been written a total number of times greater than is safe for writing data in the second type of flash memory, and write disturb errors might start occurring if the data is not soon moved.

FIG. 4D is a flow diagram of a method for managing flash memory, applying an error count threshold and an error rate threshold. The method shown in FIG. 4D applies a dynamic property of the data, namely a count of the read errors, and a policy relating thereto, to direct placement of the data into various types of flash memory. In further embodiments, just the error count threshold or just the error rate threshold could be applied. An error count threshold could apply to a cumulative count of errors, or to an instantaneous error correction, e.g., of more than a specified number of bits in a data read in some embodiments. Read errors of data in the second type of flash memory are counted during a time interval, in an action 450. For example, the tracking unit could dedicate an error correction code counter and a timer, to count the time interval and the number of errors that occurred during reads of data.

In a decision action 452, a question is asked, is this the expiration of the time interval? If the answer is no, the time interval has not expired, the flow branches back to the action 450, to continue counting the read errors during the time interval. If the answer is yes, the time interval has expired, the flow branches to the decision action 454. In the decision action 454 a question is asked, does the read error count over the entire time interval meet the read error rate threshold value? If the answer is yes, the read error count over the entire time interval meets the read error rate threshold value, the flow branches to the action 460, in order to relocate the data to the first type of flash. This could occur because the read error rate is excessive, and the data is then moved to a type of flash memory having a lower read error rate. If the answer is no, the read error count over the entire time interval does not yet meet the read error rate threshold value, the flow branches to the action 456.

In the action 456, the count of the read errors of the data, in the second type of flash, continues. For example, even if a read error rate has not been exceeded, the total number of reads could still be a concern. Exceeding either a read error rate threshold value or a total count of reads threshold value could cause read errors to become more likely. In a decision action 458 a question is asked, does the read error count meet the read error count threshold for the second type of flash? If the answer is no, the read error count does not yet meet the read error count threshold value, the flow branches back to the action 456, to continue counting the read errors. If the answer is yes, the read error count meets the read error count threshold value, the flow branches to the action 460. The data is relocated to the first type of flash, in the action 460. This could occur because read errors are likely to occur if further reads of the data in the second type of flash memory are performed, and it is safer to move the data to a type of flash memory that has a lower read error rate.

FIG. 4E is a flow diagram of a method for managing flash memory, applying thresholds relating to properties of data and memory. The method shown in FIG. 4E applies a dynamic property of the data, namely a read error rate, and a policy relating thereto, to direct placement of the data into various types of flash memory. A read error rate of data in a type of flash memory is determined, in an action 466. This read error rate could be determined by counting the number of read errors of the data over a span of time or over a variable or predetermined number of reads, e.g., by dividing the number of read errors by the number of reads on an ongoing basis or after a fixed number of reads. This would produce a read error rate as a function of time or a read error rate as a function of the number of reads.

In a decision action 468, a question is asked, is the read error rate above a threshold value for data having a particular static property? For example, the data could have the static property of being a portion of an operating system file, or a portion of an image file, and various types of data might have differing thresholds for a read error rate. If the answer is no, the read error rate is not above the threshold value, the flow branches back to the action 466, so that the read error rate can be monitored further. If the answer is yes, the read error rate is above the threshold value, the flow branches to the decision action 470.

In the decision action 470, a question is asked, is the read error rate above the threshold value for this type of flash memory? For example, various types of flash memory may have differing read error rates, so that differing read error rate thresholds are established for the various types of flash memory. A read error rate that is greater than a read error rate threshold value, for a type of flash memory, may indicate that the page or block in the flash memory is experiencing wear from a large number of reads or writes, and is producing errors more frequently as a result. If the answer is yes, the read error rate is above the threshold value for this type of flash memory, the flow branches to the action 472, to relocate the data elsewhere in the same type of flash memory. It should be appreciated that this relocation of the data could be part of a wear leveling process. If the answer is no, the read error rate is not above the threshold value for this type of flash memory, the flow branches to the action 474, to relocate the data to a type of flash memory having a lower read error rate. This could occur because the type of flash memory in which the read error rate is observed is not wearing out, but is nonetheless producing errors too great a rate for this particular data, i.e., the read error rate is exceeding the threshold for data with this static property as discussed above. It should be appreciated that the flow diagram of FIG. 4E provides an example of an interaction between a dynamic property of data and a static property of data, in decisions as to where in various types of flash memory to locate the data.

FIG. 4F is a flow diagram of a method for managing flash memory, applying differing error correction thresholds for data verification and long-term reads. The method shown in FIG. 4F applies a dynamic property of the data, namely a rate of error correction and a policy relating thereto, to direct placement of the data into various types of flash memory. Data is written to a second type of flash memory, in an action 480. For example, the second type of flash memory could be a type that has an intermediate error rate as compared to a first type of flash memory having a lower error rate.

After the data is written to the second type of flash memory, the data is verified. During data verification, a rate of error correction is determined, in an action 482. For example, the tracking unit could count the number of times during reads of the data an error is corrected using error correction code and tracking this number using one of the error correction code counters. This could be performed as a sequence of data bytes is read out from the second type of flash memory, during verification of the data, and each time an error occurs the error correction code counter is incremented. The total number of error corrections could then be divided by the total number of bytes (or words or other lengths of data) read out, to determine the error correction rate. In a decision action 484, a question is asked, is the rate of error correction below a first error correction threshold value? For example, the first error correction threshold value could be a data verification error correction threshold value. If the answer is yes, the flow branches to the action 488 for long-term monitoring of the data. If the answer is no, the flow branches to the action 486.

In the action 486, the data is relocated elsewhere in the second type of flash memory. This could occur because the verification showed a greater number of errors, i.e., a greater rate of error correction than should be the case for the second type of flash memory if not experiencing wear. The conclusion would be that the particular page or block in the second type of flash memory may be experiencing wear from excessive reads or writes, and is therefore producing excess errors even upon a first write of new data and verification of this data. The data is then relocated as a consequence, and the rate of error correction is again tested to see whether this new location in the second type of flash memory is or is not experiencing wear. After the action 486, the flow branches back to the action 482, in order to check the rate of error correction in the new location.

In the action 488, long-term monitoring of the data commences, and a rate of error correction during subsequent reads of the data is determined. In a decision action 490, a question is asked, is the rate of error correction below a second error correction threshold value? For example, the second error correction threshold value could be a long-term error correction threshold value, which differs from the verification error correction threshold value. Particularly, the long-term error correction threshold value could be equal to, lesser than, or greater than the verification error correction threshold value. If the answer is yes, the rate of error correction is below the second error correction threshold value, the flow branches back to the action 488, for ongoing monitoring of the rate of error correction. If the answer is no, the rate of error correction is not below the second error correction threshold value, the flow branches to the action 492, to relocate the data to the first type of flash memory. This could occur because, even though data location in the second type of flash memory initially verified without errors or with an acceptable low number of errors, subsequent reads have generated wear, and it is advisable to relocate the data to a type of flash memory that has a lower error rate. Alternatively, the relocation of the data could be advisable because the data is experiencing a higher number of reads, which are generating the excess errors as a result of read disturbs or wear. The method shown in FIG. 4F could be applied as part of data verification and monitoring, or wear leveling or both. It should be appreciated that each of FIGS. 4A-F include a loop back from the final method operation to the initial method operation as the data may change or evolve over time and the methods described herein may monitor these changes by repeating as needed.

It should be appreciated that further embodiments of the method are readily developed to address location of data in various types of flash memory in accordance with properties of the data, and that these properties can include static properties or dynamic properties. In some embodiments, a policy can combine two or more measurements, or two or more policies can be enacted or combined. For example, a high read error rate combined with a high read rate could result in moving data to a lower error-rate flash or nonvolatile memory, or application of a more advanced error correction mechanism on a less reliable flash or nonvolatile memory memory. Data could be placed in a type of nonvolatile memory according to an intended residence time of the data in that type of nonvolatile memory. The intended residence time could be based on the file type, an object type or an object identifier. Later, the data could be moved to another type of nonvolatile memory if the data has resided longer than the intended residence time, which could act as a threshold. As a further example, a combination of a high number of reads and a low number of writes to a particular location could result in moving data into a flash memory with a high read endurance but a low write cycle endurance. Various mechanisms for tracking or deriving the dynamic properties of the data are readily developed in accordance with the teachings herein. In embodiments related thereto, at least one dynamic property of the data, and at least one policy relating the dynamic property to the various types of flash memory, are applied to the decision(s) as to where to place or relocate the data, i.e., the decision or decisions as to which type of flash memory to write or place the data into. Various mechanisms for determining the static properties of the data are readily developed in accordance with the teachings herein. In embodiments related thereto, at least one static property of the data, and at least one policy relating the static property of the data to the various types of flash memory, are applied to the decision(s) as to where to write or place the data. Embodiments of the method can be applied to flash memories having two or more types of flash memory, and parameters, thresholds, properties, and policies relating to two types, three types, four types, five types or more of flash memory are readily devised in accordance with the teachings herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for managing various types of flash memory, or managing other types of memory, in accordance with various embodiments. The computing device includes a central processing unit (CPU) 501, which is coupled through a bus 505 to a memory 503, and mass storage device 507. Mass storage device 507 represents a persistent data storage device such as a disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments. It should be further appreciated that the computing device may include well-known components such as one or more counters 513, timers 515, or communication ports 517. One or more of the communication ports 517 could be connected to a network 519.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS-WINDOWS™, UNIX™, LINUX™, iOS™, CentOS™, Android™, Redhat Linux™, z/OS™, EMC ISILON ONEFS™, DATA ONTAP™ or other known operating systems. It should be appreciated that the embodiments described herein may be integrated with virtualized computing system also.

Embodiments of the flash storage, flash manager and flash memory can be scaled for large business, small business, consumer and other environments, and for products from the size of server farms (and larger) down to consumer products. Such products could include solid-state drives, combination hard drive/solid-state drives, memory cards for business computing environments, personal computers, or storage devices, USB devices, touch tablets, integrated circuits or integrated circuit sets for personal computing devices from desktop to handheld to pocket-sized or smaller. One product for which an embodiment is suitable is a personal digital assistant (PDA), with computing and cellular telephonic capabilities. The flash memory could be placed on a single integrated circuit with multiple types of flash memory. In further embodiments, the flash memory, of multiple types, could be implemented in a single device, board, box, drive, or appliance, e.g., a network-attachable storage, or scaled up to an enterprise memory storage. In one embodiment, the flash memory is on one or more integrated circuits, and the flash manager is on one or more integrated circuits, and these could be in separate packages or in a multichip package. In one embodiment, the flash memory and the flash manager are combined on a single integrated circuit. In another embodiment, this single integrated circuit, or multiple integrated circuits, could be implemented in a mobile form factor, such as a thumb drive, or a product with a smaller form factor such as or comparable to CompactFlash, or even smaller.

Many embodiments, as disclosed herein, place or relocate data in various types of flash memory regardless of the read access time of the flash memory. In many embodiments, placement or relocation of data in various types of flash memory is independent of data access time requirements for the data. In some embodiments, the read access times of multiple types of flash memory therein are approximately the same, so that read performance (as to access time) of the flash storage is relatively unaffected by which type of flash memory is being read for access to a given data. It should be appreciated that in some of the embodiments described herein a single copy of the data is in the system at a time point, unlike caching systems which have multiple copies of the data in the storage memory. However, such embodiments could also be used as storage memory in a caching system.

Embodiments can be directed to a single property of data, which could be a static property or a dynamic property. Embodiments can be directed to multiple properties of data, which could be static properties, dynamic properties, or both. Embodiments can be directed to a single policy, which relates to one or more static properties of data, one or more dynamic properties of data, or both, or to multiple policies. Decisions can be based on multiple factors, e.g., a small number of writes and a large number of reads. Embodiments can be directed to multiple types of flash memory having differing numbers of levels/bits per cell, or differing qualities relating to data, or both. For example, different types of flash memory could be optimized for read endurance (number of read cycles) and/or read retention (length of time to retain data), at various trade-offs of lower write endurance and/or erase cycle endurance, and policies could be developed accordingly. Different types of flash memory could have the same number of bits per cell but differing properties. For example, two types of flash with the same number of bits per cell could be differentiated by having differing retention times, differing numbers of program and erase cycles, or other characteristics. In some embodiments, the number of program and erase cycles may be further defined based on the type of environment, e.g., an enterprise environment vs. a non-enterprise environment.

Further embodiments of the methods and devices disclosed herein are directed to other forms of memory, for instance phase change memory and other non-flash types of nonvolatile memory. Where another form of memory has multiple types and trade-offs relative to data properties in those multiple types, but unrelated to read access times, the teachings disclosed herein may be applicable to that form of memory. Embodiments could include multiple types of memory but exclude flash, or could include flash and one or more other types of memory, or two or more types of flash and one or more other types of memory, and so on. It should be appreciated that the embodiments may be extended to volatile memory types as well as nonvolatile memory types, and in some embodiments, combinations of volatile and nonvolatile memory types.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module and the controller could be configured to perform various actions, e.g., of a method, an application, a layer or an agent.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including handheld devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for managing nonvolatile memory, comprising:
   tracking a count of how many reads of a portion of data have at least one error;
   identifying when the count reaches the threshold;

determining to which type of a plurality of types of nonvolatile memory to write the portion of data, based on the count of the reads reaching the threshold, wherein the plurality of types of nonvolatile memory includes types differing in at least one from a group consisting of: number of bits per cell, data retention time, read cycle endurance, write cycle endurance, erase cycle endurance, and read error rate, and wherein the determining is in accordance with a plurality of policies, the plurality of policies comprises:

writing text data to a type of nonvolatile memory having a lower read error rate and writing image data to a type of nonvolatile memory having a higher read error rate; and moving the portion of data from a type of nonvolatile memory having a lower read cycle endurance to a type of nonvolatile memory having a higher read cycle endurance in response to the count exceeding the threshold; and writing the portion of data to a nonvolatile memory of the determined type, wherein at least one action of the method is performed by a processor.

2. The method of claim 1, wherein the portion of data is tracked based on whether the portion of data is one of a file type, an object type, and an object identifier.

3. The method of claim 1, wherein the threshold remains constant.

4. The method of claim 1, wherein the count is represented in metadata.

5. The method of claim 1, wherein the plurality of policies comprises:

writing data having a number of discards during deduplication, which number of discards meets a deduplication threshold, to the type of nonvolatile memory having the lower read error rate; and writing data having a single instance during deduplication to the type of nonvolatile memory having the higher read error rate.

6. The method of claim 1, wherein the plurality of policies comprises:

moving the portion of data from the type of nonvolatile memory having the higher read error rate to the type of nonvolatile memory having the lower read error rate in response to the count exceeding the threshold.

7. A method for managing nonvolatile memory, comprising:

tracking a count of how many reads of a portion of data have at least one error;

identifying when the count reaches the threshold;

determining to which type of a plurality of types of nonvolatile memory to write the portion of data, based on the count of the reads reaching the threshold, wherein the plurality of types of nonvolatile memory includes types differing in at least one from a group consisting of: number of bits per cell, data retention time, read cycle endurance, write cycle endurance, erase cycle endurance, and read error rate, and wherein the determining is in accordance with a plurality of policies, the plurality of policies comprises:

writing text data to a type of nonvolatile memory having a lower read error rate and writing image data to a type of nonvolatile memory having a higher read error rate; writing data having a number of discards during deduplication, which number of discards meets a deduplication threshold, to the type of nonvolatile memory having the lower read error rate; and writing data having a single instance during deduplication to the type of nonvolatile memory having the higher read error rate; and writing the portion of data to a nonvolatile memory of the determined type, wherein at least one action of the method is performed by a processor.

8. The method of claim 7, wherein the portion of data is tracked based on whether the portion of data is one of a file type, an object type, and an object identifier.

9. The method of claim 7, wherein the threshold remains constant.

10. The method of claim 7, wherein the count is represented in metadata.

11. The method of claim 7, wherein the plurality of policies comprises:

moving the portion of data from a type of nonvolatile memory having a lower read cycle endurance to a type of nonvolatile memory having a higher read cycle endurance in response to the count exceeding the threshold.

12. The method of claim 7, wherein the plurality of policies comprises:

moving the portion of data from the type of nonvolatile memory having the higher read error rate to the type of nonvolatile memory having the lower read error rate in response to the count exceeding the threshold.

13. A method for managing nonvolatile memory, comprising:

tracking a count of how many reads of a portion of data have at least one error;

identifying when the count reaches the threshold;

determining to which type of a plurality of types of nonvolatile memory to write the portion of data, based on the count of the reads reaching the threshold, wherein the plurality of types of nonvolatile memory includes types differing in at least one from a group consisting of: number of bits per cell, data retention time, read cycle endurance, write cycle endurance, erase cycle endurance, and read error rate, and wherein the determining is in accordance with a plurality of policies, the plurality of policies comprises:

writing text data to a type of nonvolatile memory having a lower read error rate and writing image data to a type of nonvolatile memory having a higher read error rate; and moving the portion of data from the type of nonvolatile memory having the higher read error rate to the type of nonvolatile memory having the lower read error rate in response to the count exceeding the threshold; and writing the portion of data to a nonvolatile memory of the determined type, wherein at least one action of the method is performed by a processor.

14. The method of claim 13, wherein the portion of data is tracked based on whether the portion of data is one of a file type, an object type, and an object identifier.

15. The method of claim 13, wherein the threshold remains constant.

16. The method of claim 13, wherein the count is represented in metadata.

17. The method of claim 13, wherein the plurality of policies comprises:

moving the portion of data from a type of nonvolatile memory having a lower read cycle endurance to a type of nonvolatile memory having a higher read cycle endurance in response to the count exceeding the threshold.

18. The method of claim 13, wherein the plurality of policies comprises:

writing data having a number of discards during deduplication, which number of discards meets a deduplication threshold, to the type of nonvolatile memory having the lower read error rate; and writing data having a single instance during deduplication to the type of nonvolatile memory having the higher read error rate.

* * * * *